(12) United States Patent
Sun

(10) Patent No.: US 8,100,305 B2
(45) Date of Patent: Jan. 24, 2012

(54) AUTOMOBILE HANGER

(76) Inventor: Shiyu Sun, Shanghai (CN)

( * ) Notice: Subject to any disclaimer, the term of this patent is extended or adjusted under 35 U.S.C. 154(b) by 547 days.

(21) Appl. No.: 12/370,778

(22) Filed: Feb. 13, 2009

(65) Prior Publication Data
US 2010/0059463 A1 Mar. 11, 2010

(51) Int. Cl.
*B60R 7/10* (2006.01)
(52) U.S. Cl. .............. 224/275; 223/85; 223/88; 223/91; 224/558
(58) Field of Classification Search .................. 224/275, 224/558, 927; 223/85, 88, 90–93, 96
See application file for complete search history.

(56) References Cited

U.S. PATENT DOCUMENTS

| 6,206,254 | B1 * | 3/2001 | Lin | 223/94 |
| 7,731,068 | B2 * | 6/2010 | Scicluna | 223/91 |
| 2008/0245833 | A1 * | 10/2008 | Vacity | 224/275 |

* cited by examiner

*Primary Examiner* — Justin Larson
*Assistant Examiner* — Adam Waggenspack
(74) *Attorney, Agent, or Firm* — Suiter Swantz pc llo

(57) ABSTRACT

The present disclosure is directed to an automobile hanger. The hanger may comprise a hanger frame, a connecting member, a supporting member, a fastening member and a hook. The hanger may be configured as a supporting hanger and to be attached to the headrest column of an automobile seat. Alternatively, the hanger may also be configured as a hook hanger which may be utilized in an automobile or elsewhere.

1 Claim, 9 Drawing Sheets

AUTOMOBILE HANGER

CROSS-REFERENCE TO RELATED APPLICATIONS

The present application claims priority based on Chinese Application No. 200820152751.5 filed Sep. 5, 2008, the disclosure of which is hereby incorporated by reference in its entirety.

TECHNICAL FIELD

The present disclosure generally relates to an automobile hanger, and more particularly to a hanger for use within an automobile.

BACKGROUND

Various kinds of hangers are available for use in automobiles. Such hangers may be made of metal by bending, with two ends respectively fixed on two supporting columns of a head rest of an automobile seat. The sizes of the two supporting columns and the distances there between may be different for different automobile manufactures and/or various automobile models. Thus, there may be difficulties in fixing/securing the hangers to different automobiles. In addition, existing automobile hangers may not be suitable for carrying elongated items such as towels and/or pants.

SUMMARY

Accordingly, the present disclosure is directed to an automobile hanger. The automobile hanger may comprise a hanger frame, a connecting member, a supporting member, a fastening member and a hook. The hanger frame may further comprise two upper arc sections, two circular arc heads and a lower straight section. The two upper arc sections and the lower straight section may be connected by the two circular arc heads. The two upper arc sections and the two circular arc heads form two lower invagination points.

The connecting member may comprise two ends for connecting the two upper arc sections of the hanger frame. Each of the two ends of the connecting member may comprise a frame bore coupled to an opening end of each of the two upper arc sections. The frame bores and the opening ends may be configured as certain shapes so as to prevent the connecting member from rotating with respect to the hanger frame. For example, the frame bores and the opening ends may be at least one of an oval shape or having at least one flat surface. The connecting member may further comprise a hook bore at an upper portion of the connecting member, an oval supporting bore at a lower portion of the connecting member, and a window at a middle portion of the connecting member.

The supporting member may be configured as a Z-shaped metal lever twisted about a vertical axis at about 90 degrees. The supporting member may comprise an upper bend, an upright lever and a lower bend. The upper bend may include a first flat head for coupling with the supporting bore of the connecting member. The lower bend may include a second flat head for coupling with the fastening member.

The fastening member may be configured as a screw-type clamping unit comprising an opening end for clamping to a headrest column of an automobile seat, and a closed end having a supporting bore for coupling with the lower bend of the supporting member. The screw-type clamping unit of the fastening member may comprise a fastening clamp, a fastening bolt and a knob. The fastening clamp may comprise a fastening clamp static piece and a fastening clamp moving piece. The static piece and the moving piece may form an approximate triangle. The teeth and tooth spaces of the static piece may be configured for snapping alternatively in the teeth and tooth spaces of the moving piece. The static piece and the moving piece may be configured for clamping the headrest column of the automobile seat when the static piece and the moving piece form an approximate triangle.

The hook may comprise a hook head at an upper portion of the hook, a flexible flat section at a middle portion of the hook, a cylindrical rotating axis at a lower portion of the hook, and a semi-spherical claw at a bottom portion of the hook. The semi-spherical claw may include a lancing for facilitating insertion of the claw into the hook bore at the upper portion of the connecting member. The claw may be configured for clamping in the window at the middle portion of the connecting member.

Alternatively, the connecting member of the automobile hanger may be a pair of two symmetrical pieces for clamping the opening ends of the two upper arc sections of the hanger frame. The two symmetrical pieces may be fastened utilizing nuts and bolts. Additionally, the fastening member may be one or more U-shaped plates or straps with bolts for latching to the headrest column of the automobile.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the subject matter disclosed, which is illustrated in the accompanying drawings.

The present disclosure is directed to an automobile hanger. The hanger may comprise a hanger frame, a connecting member, a supporting member, a fastening member and a hook. The hanger may be configured as a supporting hanger utilizing the supporting member and the fastening member for attaching to the headrest column of an automobile seat. Alternatively, the hanger may be configured as a hook hanger, allowing the hanger to be utilized in an automobile and/or elsewhere (e.g., at home or hotel).

Figure 1:
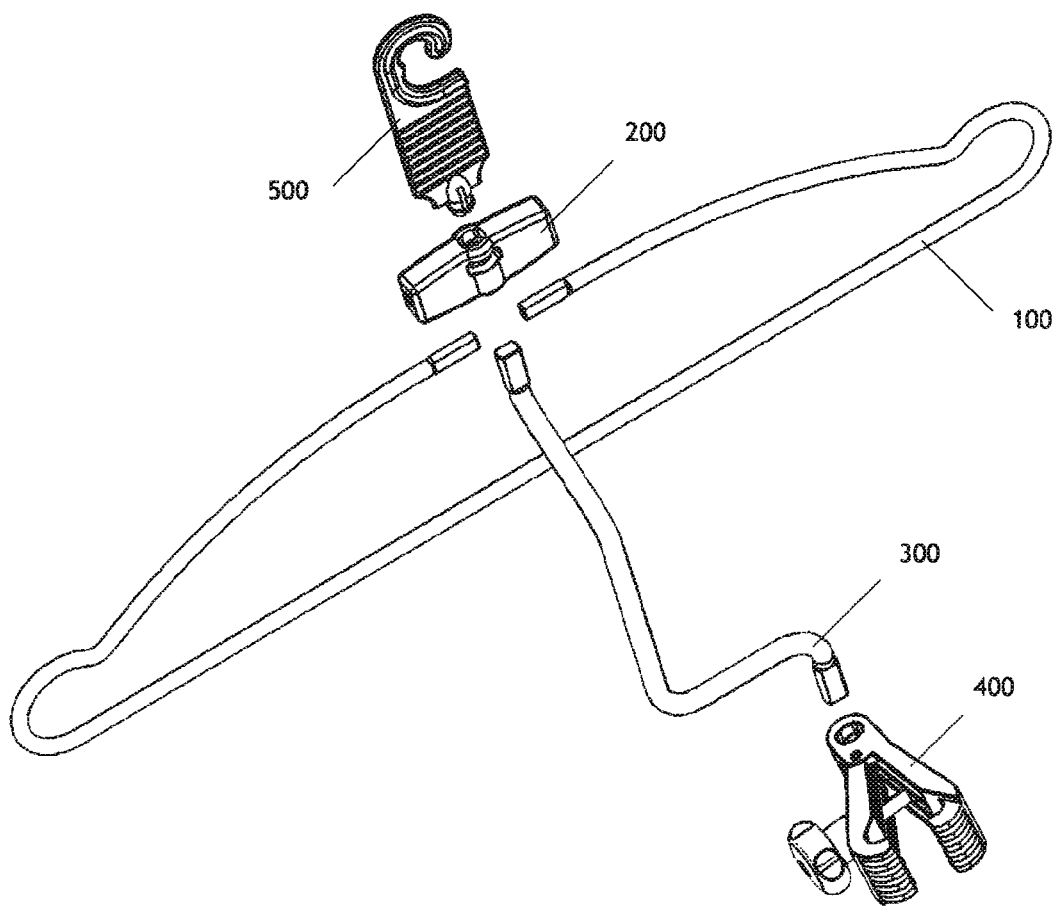
FIG. 1 is an exploded figure of the automobile hanger of the present disclosure.

Referring generally now to FIG. 1, the present disclosure is directed to an automobile hanger for use within an automobile. In one embodiment, the automobile hanger may comprise a hanger frame 100, a connecting member 200, a supporting member 300, a fastening member 400 and a hook 500. The connecting member 200 may connect opening ends of the two upper arc sections 101 of the hanger frame 100. An upper end of the supporting member 300 may be inserted into a supporting bore 202 of the connecting member 200 and a lower end of the supporting member 300 may be inserted into a supporting bore 403 of the fastening member 400. A claw 504 of the hook 500 may be inserted into a hook bore 201 of an upper portion of the connecting member 200, and the claw 504 may clamp to a window 204 at a middle portion of the connecting member 200.

Figure 3:
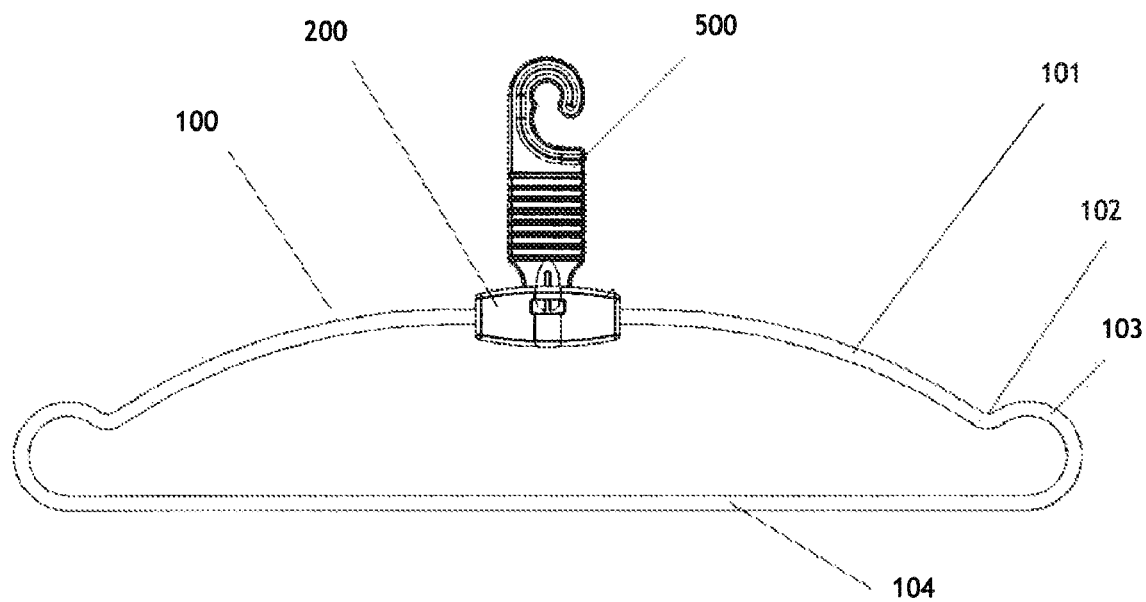
FIG. 3 is schematic of an automobile hanger of the present disclosure in a hanging state.

As shown in FIG. 3, the hanger frame may comprise the two upper arc sections 101, two circular arc heads 103 and a lower straight section 104. The upper arc sections 101 and the lower straight section 104 may be connected by the circular arc heads 103. The two upper arc sections 101 and the two circular arc heads 103 may be used for hanging clothing, and the lower straight section 104 may be used for hanging pants or towels. A plurality of clamps may be added to the lower straight section 104 for clamping small items of clothing such as socks, handkerchief, etc. The tower invagination points 102 may be formed at the positions where the upper arc sections 101 and the two circular arc heads 103 are connected. The invagination points 102 may be suitable for items such as vests and tank-tops to buckle at the lower invagination points 102 to prevent slipping.

Figure 6:
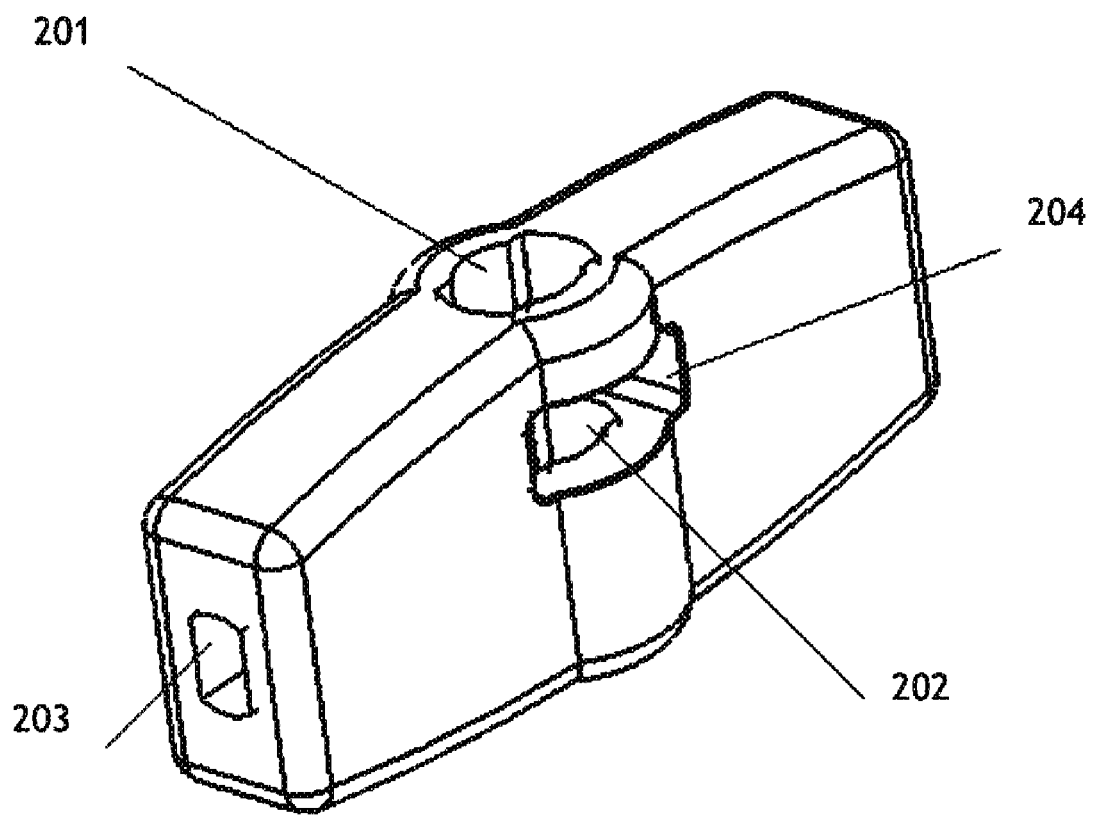
FIG. 6 is a structure schematic of the connecting member.

As shown in FIG. 6, each end of the connecting member 200 may have a frame bore 203 for coupling the opening ends of the two upper arc sections 101. The coupling mechanism may be carried out by an oval rivet coupling to prevent the connecting member 200 from rotating with respect to the hanger frame 100. For example, the frame bores 203 at both ends of the connecting member 200 and the opening ends of the upper arc sections 101 may be in an oval shape, or with flat surfaces on both sides or with flat surface on at least one side.

The connecting member 200 may comprise a hook bore 201 at its upper portion, an oval supporting bore 202 at its lower portion for coupling to the supporting member 300, and a window 204 at its middle portion to facilitate coupling and release of the hook 500. Alternatively, the connecting member 200 may also be two symmetrical pieces clamping the opening ends of the two upper arc sections 101 of the hanger frame. The two pieces may be fastened with nuts and bolts. It is understood that other forms of connecting member may be utilized without departing from the spirit of the present disclosure.

Figure 2:
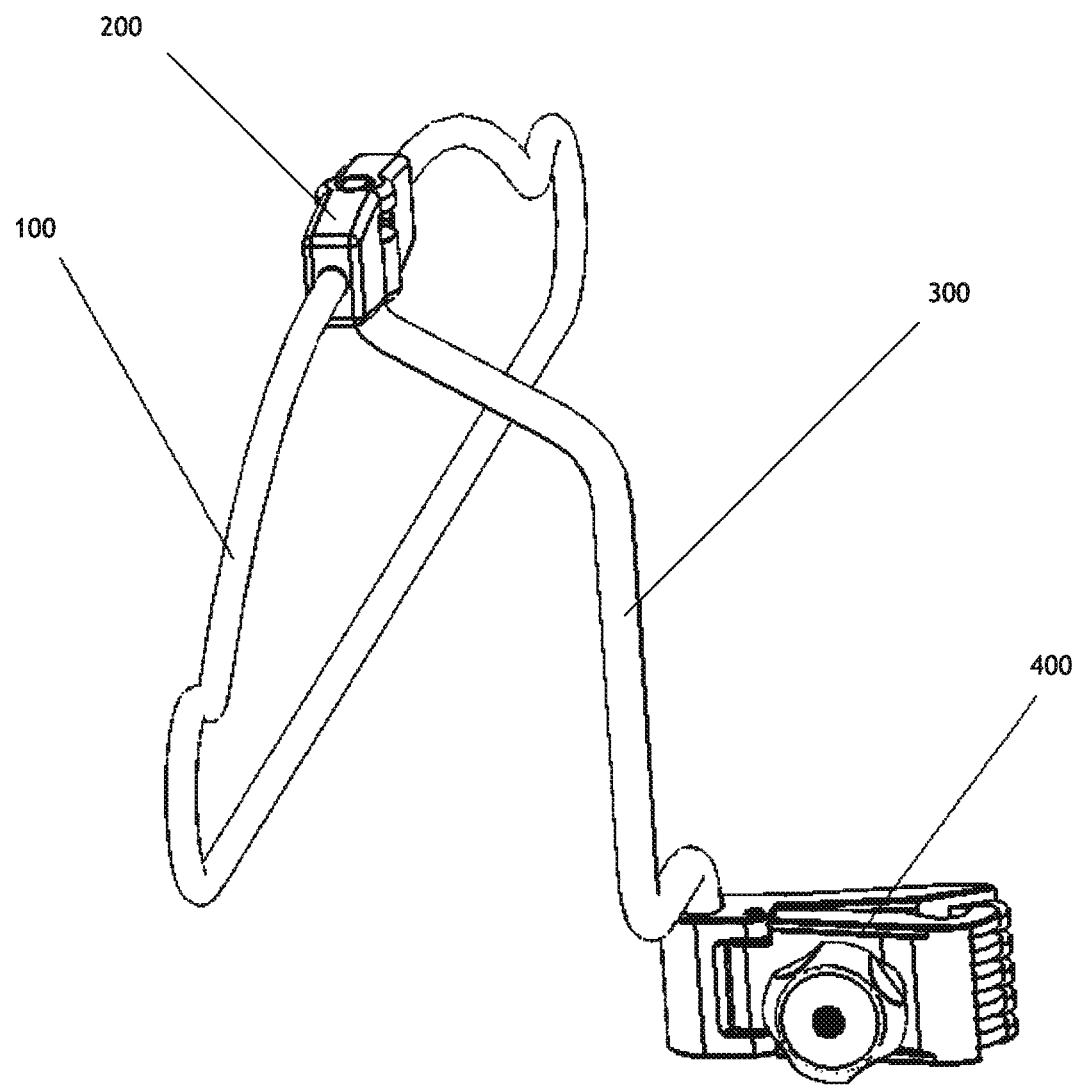
FIG. 2 is schematic of an automobile hanger of the present disclosure in a supporting state.

FIG. 2 is schematic of an automobile hanger of the present disclosure in a supporting state. The upper end of the supporting member 300 is inserted into a supporting bore 202 of the connecting member 200, and the lower end of the supporting member 300 is inserted into the supporting bore 403 of the fastening member 400.

Figure 4:
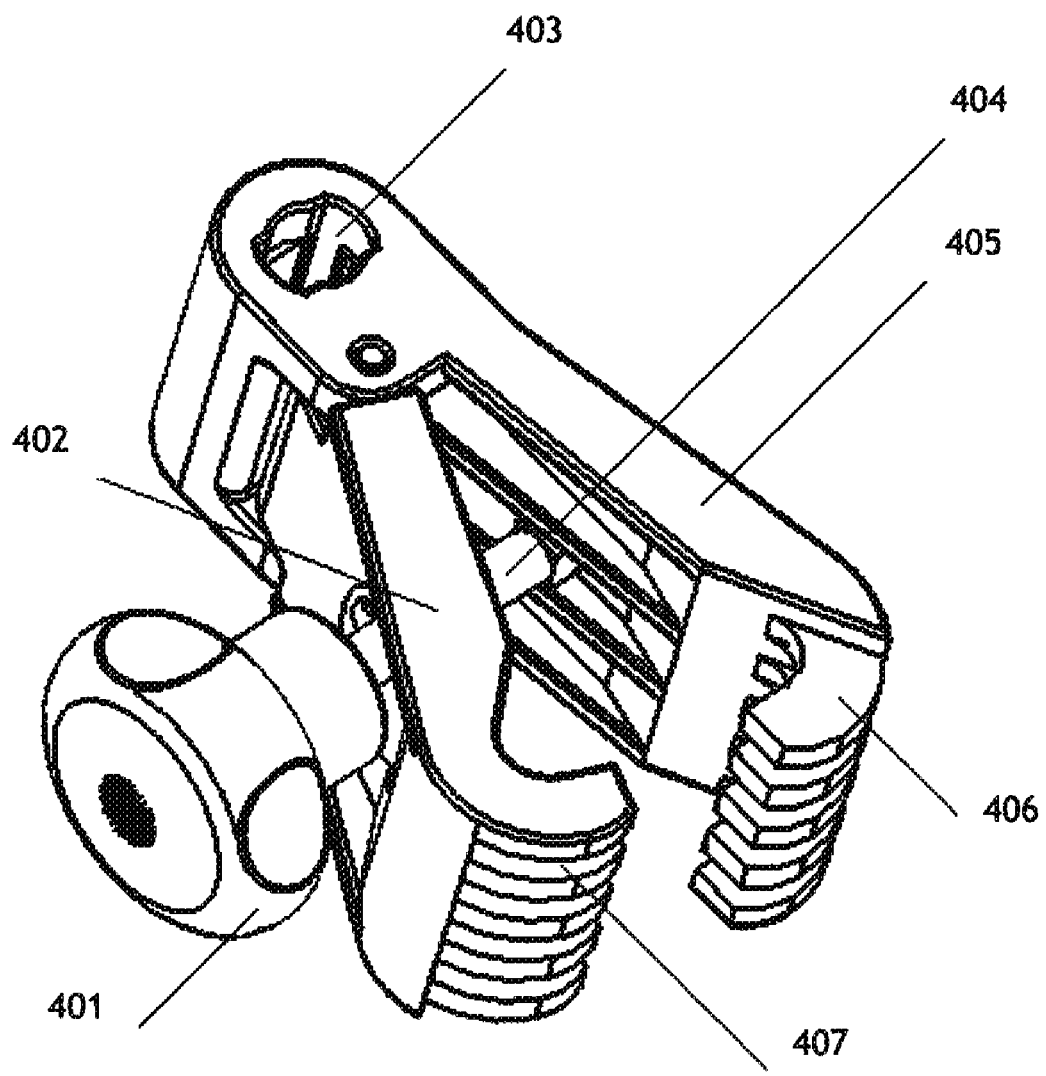
FIG. 4 is a structure schematic of the fastening member.
Figure 7:
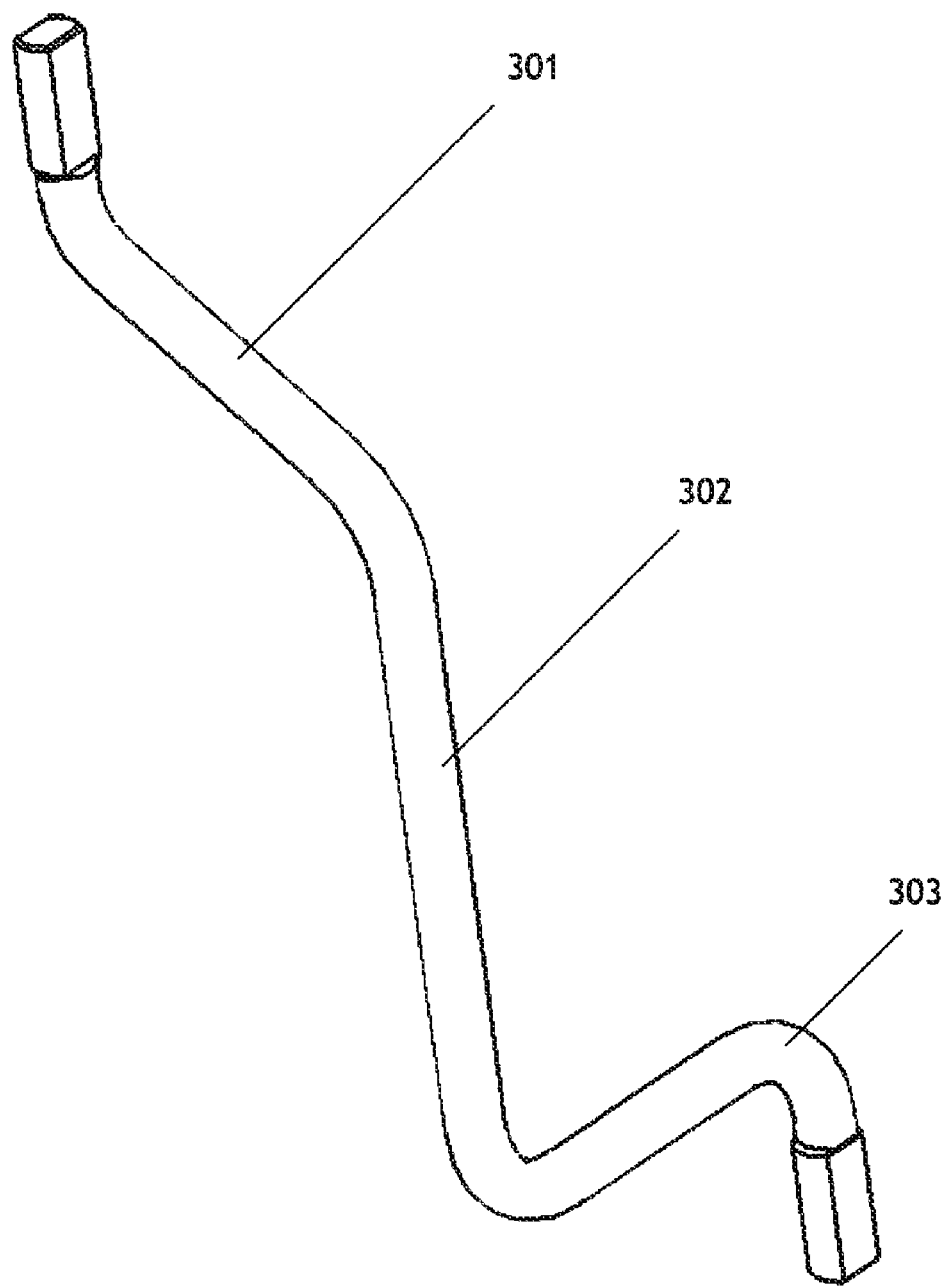
FIG. 7 is a schematic of the supporting member.

In one embodiment as illustrated in FIG. 7, the supporting member 300 may be configured as a Z-shaped metal lever twisting about a vertical axis at about 90 degrees. The supporting member may include three segments: an upper bend 301, an upright lever 302, and a lower bend 303. The ends of the upper bend 301 and the lower bend 303 may be configured as flat heads so as to facilitate mating with the connecting member 200 and the fastening member 400. The structure of the fastening member 400 is as shown in FIG. 4.

In one embodiment, the fastening member may be configured as a screw-type clamping unit with an opening end capable to clamp a headrest column of an automobile seat and a closed end having a supporting bore 403 to mate the supporting member 300. The screw-type clamping unit of the fastening member 400 may comprise a fastening clamp, a fastening bolt 404 and a knob 401. The fastening clamp may include a fastening clamp static piece 405 and a fastening clamp moving piece 402. The static piece 405 and the moving piece 402 may form an approximate triangle. The teeth 406 and tooth spaces of the static piece may be configured to snap alternatively in the teeth and tooth spaces 407 of the moving piece. The static piece and the moving piece may be configured for clamping the headrest column of the automobile seat tightly when they form an approximate triangle.

Since the supporting member 300 may be configured in a twisting Z-shape, an upper bend of the Z-shaped supporting member 300 may provide a certain spatial distance between the hanger and the seat backrest. Such a distance may be desirable for hanging clothing as the clothing may not contact the seat directly. Since the headrest of the automobile seat usually has two columns and the fastening member may clamp to one of the columns, the lower bend of the Z-shaped supporting member 300 may be utilized for correcting the hanger back to the center of the seat.

Figure 5:
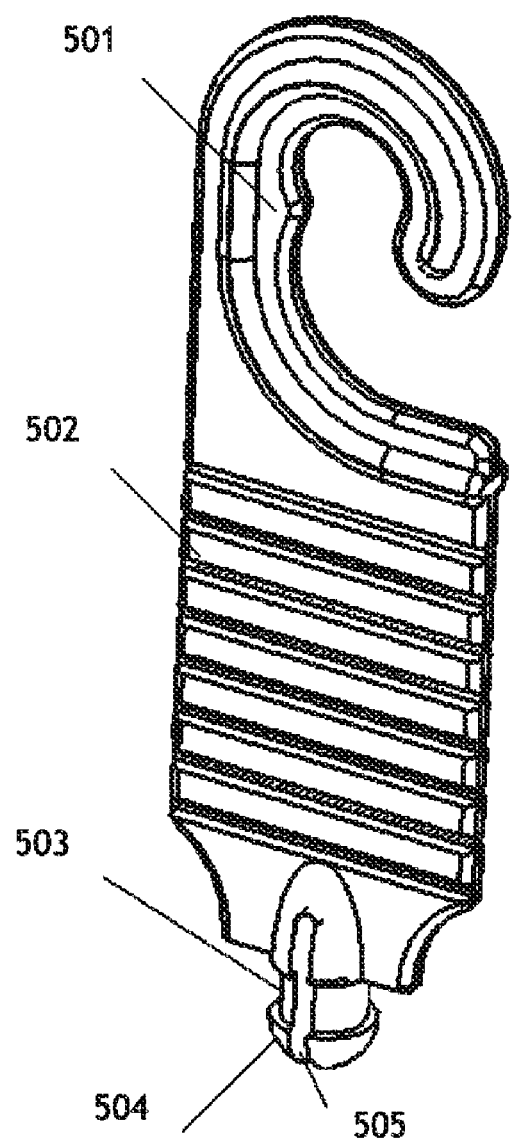
FIG. 5 is a structure schematic of the hook.

The structure of the hook is illustrated in FIG. 5. In one embodiment, the upper portion of the hook may include an ear-shaped hook head 501. The middle portion of the hook may include a washing-board-shaped flexible flat body 502. The lower portion of the hook may include a cylindrical section 503 as a rotating axis. The bottom portion of the hook may include a semi-spherical claw 504. The claw 504 may include a lancing 505 to facilitate insertion of the claw 504 to the hook bore 201 at the upper portion of the connecting member 200. The claw 504 may be configured for clamping in the window 204 at the middle portion of the connecting member 200. It is contemplated that as the upper portion of the claw 504 is a cylindrical section 503 which is smaller than the upper round bore of the connecting member, the hook 500 is capable to rotate freely about the axis of the cylindrical body (vertical axis). It is also contemplated that as the hook 500 may have a flat washing-board-shaped flexible body 502, the hook head 501 may be bended around the horizontal axis. It is understood that the hanger of the present disclosure may be attached to the headrest column of the automobile seat as well as on the handle on the inner wall of the automobile. In addition, the hanger may be utilized elsewhere such as at homes or hotels.

Figure 8:
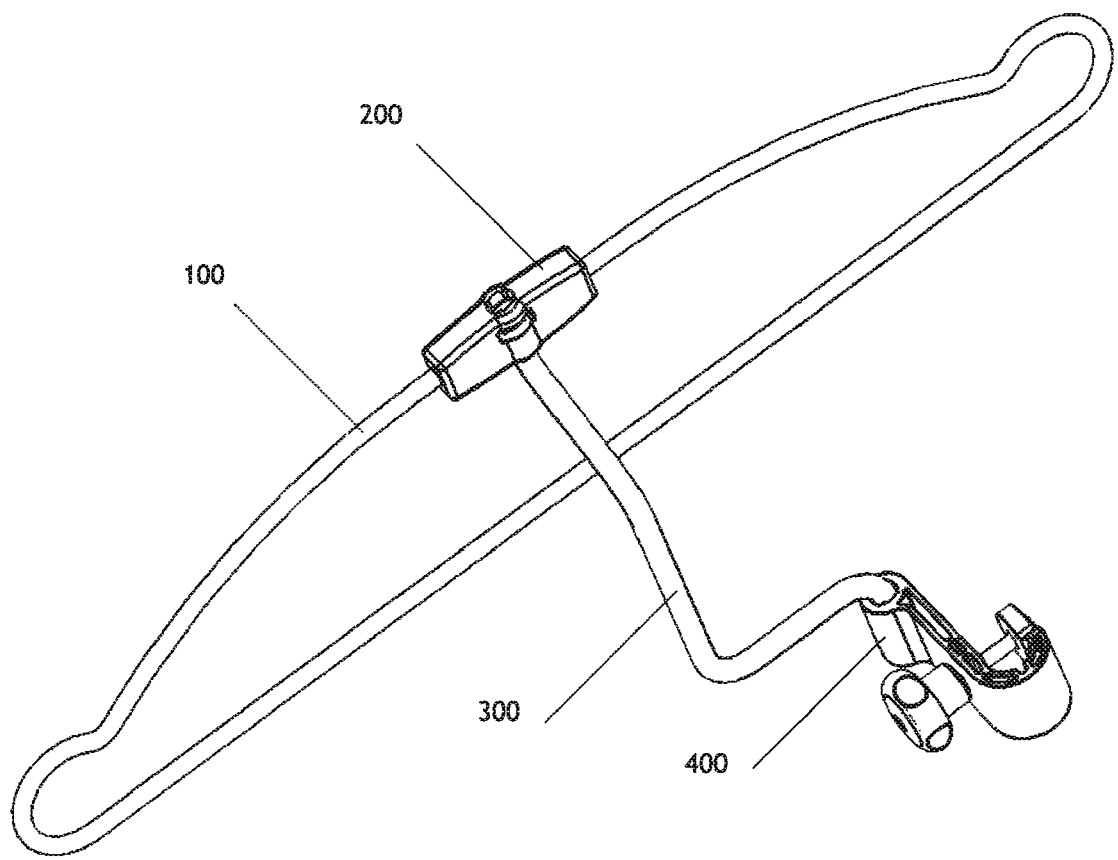
FIG. 8 is a schematic of another automobile hanger of the present disclosure in a supporting state.
Figure 9:
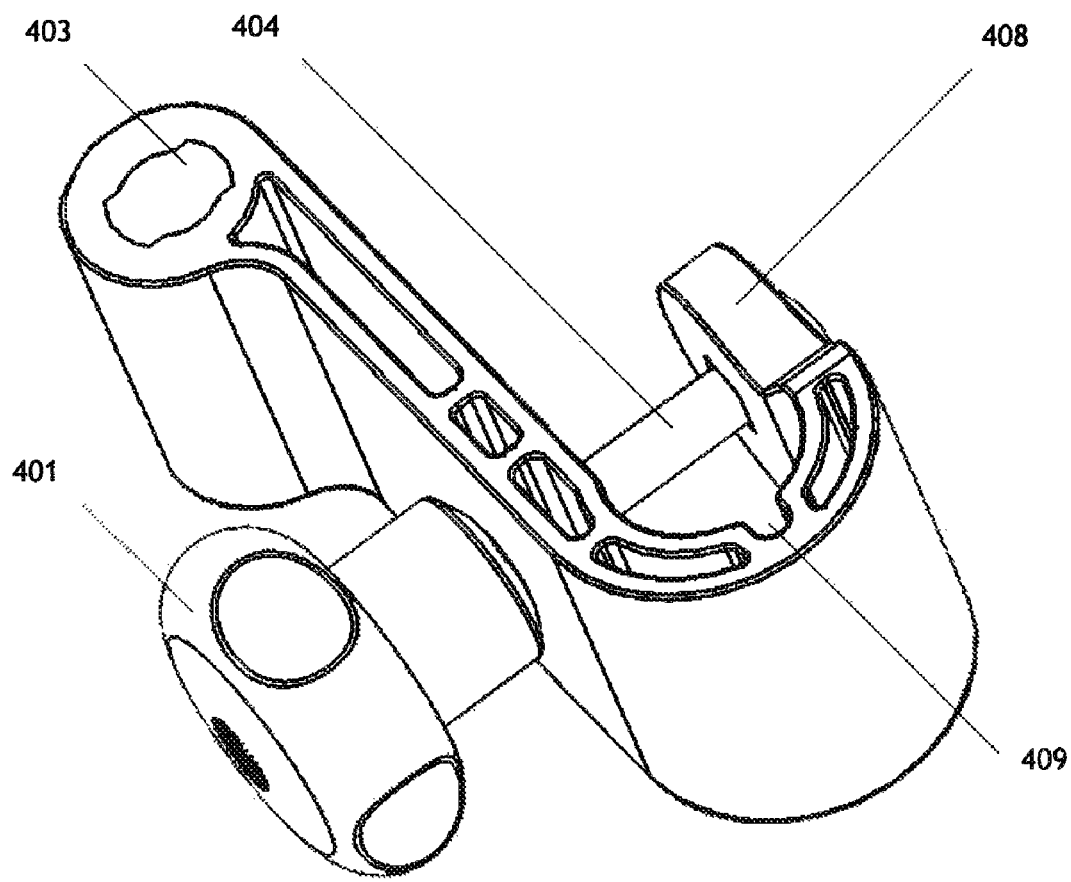
FIG. 9 is a structure schematic of the U-shaped plate fastening member.

FIG. 8 is a schematic of an alternative automobile hanger. In an alternative embodiment, the automobile hanger may comprise a hanger frame 100, a connecting member 200 and a supporting member 300 as previously described. The automobile hanger may also comprise a fastening member 400. The structure of the fastening member 400 is illustrated in FIG. 9. It this embodiment, the fastening member 400 may be configured as a U-shaped strap structure. The structure may comprise a U-shaped plate 408, a pleat joint 409, a supporting bore 403, a fastening bolt 404 and a knob 401. As the headrest column of the automobile seat is cylindrical, rotating the knob 401 may cause the fastening bolt 404 to fold two side plates of the U-shaped plate 408 inwardly, so as to clamp the headrest column of the automobile seat tightly.

It is understood that the hanger of the present disclosure may be utilized as a hanger attached to a headrest column of an automobile seat. In such a configuration the hanger frame and the connecting member may be connected to the supporting member and the fastening member. It is also understood that the hanger may be utilize as a suspended hanger. In such as configuration the hanger frame and the connecting member may be connected to the hook.

The hanger of the present disclosure may be supported or suspended. The hanger may be used at home or travel. The automobile hanger of the present disclosure may be assembled as a supporting hanger to be attached to the headrest column of an automobile seat. The hanger may also be assembled as a hook hanger and hanged on the headrest column or on a handle on the inner wall of the automobile.

It is believed that the automobile hanger of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An automobile hanger, comprising:
   a hanger frame comprising two upper arc sections, two circular arc heads and a lower straight section, the two upper arc sections and the lower straight section being connected by the two circular arc heads, the two upper arc sections and the two circular arc heads form two tower invagination points;
   a connecting member comprising two ends for connecting the two upper arc sections of the hanger frame, each of the two ends of the connecting member comprising a frame bore coupled to an end of each of the two upper arc sections, each of the frame bores and the ends of each upper arc section being at least one of an oval shape or having at least one flat surface for preventing the connecting member from rotating with respect to the hanger frame, the connecting member further comprising a hook bore at an upper portion of the connecting member, an oval supporting bore at a lower portion of the connecting member, and a window at a middle portion of the connecting member;
   a supporting member that is a Z-shaped metal lever twisted about a vertical axis at about 90 degrees, the supporting member comprising an upper bend, an upright lever and a lower bend, the upper bend having a first flat head for coupling with the supporting bore of the connecting member, the lower bend having a second flat head;
   a fastening member that is a screw-type clamping unit comprising an opening end for clamping to a headrest column of an automobile seat, and a closed end having a supporting bore for coupling with the lower bend of the supporting member, the screw-type clamping unit of the fastening member comprising a fastening clamp, a fastening bolt and a knob, the fastening clamp comprising a fastening clamp static piece and a fastening clamp moving piece, the static piece and the moving piece forming an approximate triangle, teeth and tooth spaces of the static piece configured for snapping in teeth and tooth spaces of the moving piece, the static piece and the moving piece configured for clamping the headrest column of the automobile seat when the static piece and the moving piece form an approximate triangle;
   and a hook comprising a hook head at an upper portion of the hook, a flexible flat section at a middle portion of the hook, a cylindrical rotating axis at a lower portion of the hook, and a semi-spherical claw at a bottom portion of the hook, the semi-spherical claw having a lancing for facilitating insertion of the claw into the hook bore at the upper portion of the connecting member, the claw configured for clamping in the window at the middle portion of the connecting member.

* * * * *